(12) United States Patent
Frank et al.

(10) Patent No.: US 6,494,250 B1
(45) Date of Patent: Dec. 17, 2002

(54) IMPREGNATED ALUMINA-BASED CORE AND METHOD

(75) Inventors: Gregory R. Frank, Morristown, TN (US); Ronald J. Keller, Grand Haven, MI (US); Rodney S. Haaland, Suffolk, VA (US); Charles F. Caccavale, Wharton, NJ (US); Alfred P. Kaulius, Jr., Muskegon, MI (US)

(73) Assignee: Howmet Research Corporation, Whitehall, MI (US)

( * ) Notice: Subject to any disclaimer, the term of this patent is extended or adjusted under 35 U.S.C. 154(b) by 0 days.

(21) Appl. No.: 09/924,962

(22) Filed: Aug. 8, 2001

Related U.S. Application Data

(63) Continuation-in-part of application No. 09/854,851, filed on May 14, 2001, now abandoned.

(51) Int. Cl.[7] .............. B22C 1/00; B22C 9/10; B22C 9/12
(52) U.S. Cl. ................ 164/529; 164/369
(58) Field of Search .............. 164/529, 28, 361, 164/369

(56) References Cited

U.S. PATENT DOCUMENTS

| | | | |
|---|---|---|---|
| 3,688,832 A | 9/1972 | Horton ............... 164/72 |
| 4,108,672 A | 8/1978 | Klug et al. ............ 106/38.9 |
| 4,156,614 A | 5/1979 | Greskovich et al. ...... 106/38.9 |
| 4,174,973 A | 11/1979 | Rhodes et al. .......... 106/73.2 |
| 4,244,743 A | 1/1981 | Blackburn, et al. ......... 106/55 |
| 4,248,440 A | 2/1981 | McCormick ............. 277/224 |
| 4,429,051 A | 1/1984 | Davidge et al. ............ 501/12 |
| 4,837,187 A | 6/1989 | Frank et al. ............. 501/127 |
| 5,498,132 A | 3/1996 | Carozza et al. .......... 416/97 R |
| 5,551,963 A | 9/1996 | Larmie ................. 51/307 |
| 5,580,837 A | 12/1996 | Dodds et al. ............ 501/152 |
| 5,628,945 A | 5/1997 | Riman etal. ............. 264/117 |
| 5,697,418 A | 12/1997 | Bardot et al. ............. 164/28 |
| 5,874,175 A | 2/1999 | Li ..................... 428/457 |
| 5,975,188 A | 11/1999 | Lassow et al. ........... 164/76.1 |
| 5,977,007 A | 11/1999 | Lassow et al. ........... 501/152 |
| 6,001,236 A | 12/1999 | de Nora et al. .......... 205/230 |

FOREIGN PATENT DOCUMENTS

| | | |
|---|---|---|
| EP | 0 972 853 A1 | 1/2000 |
| JP | 02030773 A | 2/1990 |
| JP | 02255571 A | 10/1990 |
| JP | 10330166 A | 12/1998 |

Primary Examiner—Kuang Y. Lin

(57) ABSTRACT

An impregnated fired porous alumina-based ceramic core for use in an investment shell mold in the casting of molten metals and alloys wherein the core is impregnated with yttria to improve core creep resistance at elevated casting temperatures and times.

10 Claims, 1 Drawing Sheet

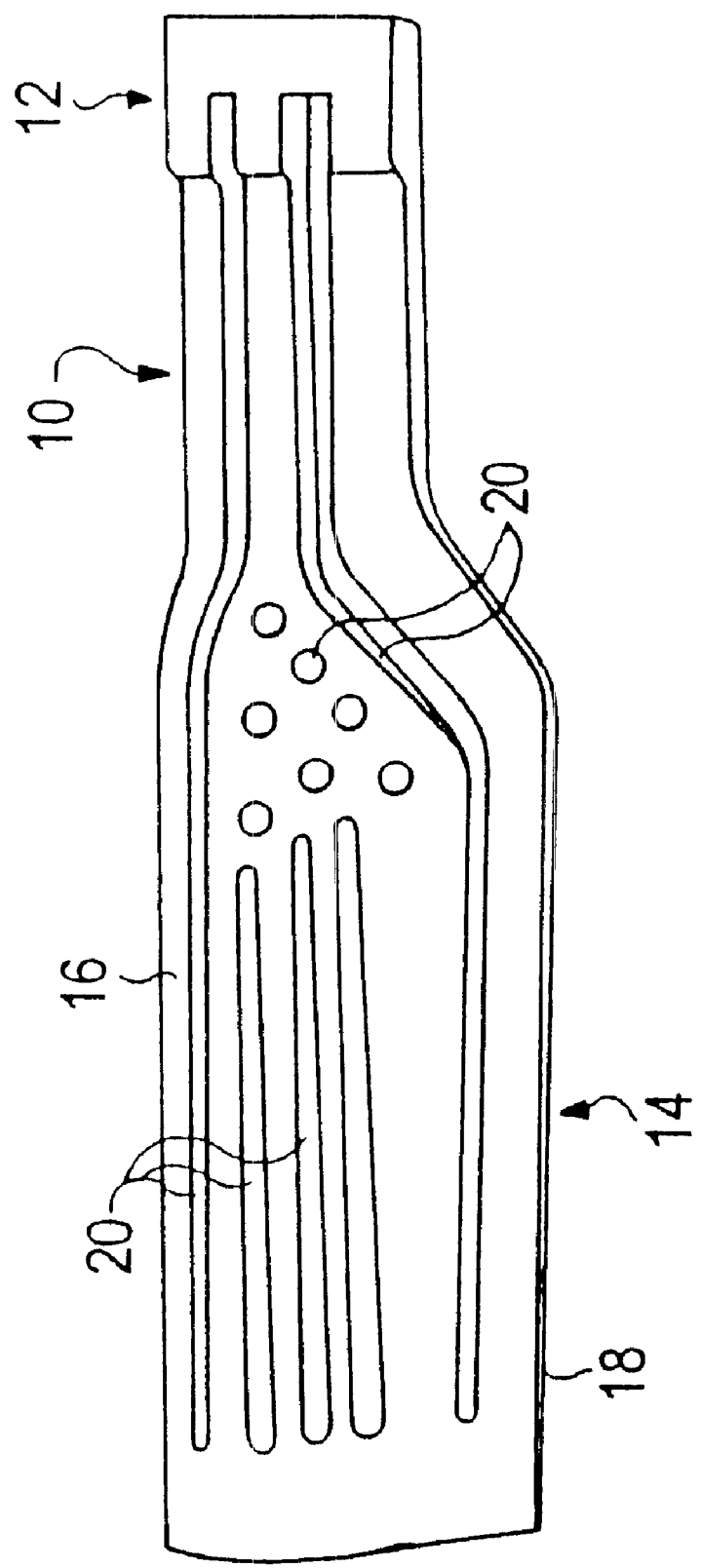
FIGURE

IMPREGNATED ALUMINA-BASED CORE AND METHOD

This application is a continuation-in-part application of Ser. No. 09/854 851 filed May 14, 2001 now abandoned.

FIELD OF THE INVENTION

The present invention relates to a fired, porous alumina-based ceramic core impregnated with yttria to improve core creep resistance at elevated casting temperature used for casting metallic materials, especially reactive superalloys, and a method of improving core creep resistance by such impregnation.

BACKGROUND OF THE INVENTION

In casting hollow gas turbine engine blades and vanes (airfoils) using conventional equiaxed techniques to produce equiaxed grain castings and directional solidification (DS) techniques to produce columnar grain or single crystal castings, a fired ceramic core is positioned in an investment shell mold to form internal cooling passageways in the airfoil. During service in the gas turbine engine, cooling air is directed through the passageways to maintain airfoil temperature within an acceptable range.

Green (unfired) ceramic cores typically are formed to desired core configuration by injection molding, transfer molding or pouring of an appropriate ceramic core material that includes one or more ceramic powders, a fugitive binder such as wax, polyproplylene, polyolefin, prehydrolized ethyl silicate, and other additives into a suitably shaped core die. After the green core is removed from the die, it is subjected to firing at elevated (superambient) temperature in one or more steps to remove the fugitive binder and sinter and strengthen the core for use in casting metallic material, such as a nickel or cobalt base superalloy. As a result of removal of the binder and fugitive filler material, if present, the fired ceramic core is porous.

The fired, porous ceramic cores used in investment casting of hollow turbine engine superalloy airfoils typically have an airfoil shape with a quite thin cross-section trailing edge region. U.S. Pat. No. 4,837,187 describes an alumina-based ceramic core formed, prior to sintering, from an admixture of alumina particles, yttria particles and a binder followed by debinding and sintering for use in investment casting of hollow airfoils from reactive superalloys, such as yttrium-bearing nickel base superalloys. Although such alumina-based cores have been used in production with success for years, the cores can exhibit a tendency to creep (move) at the high casting temperatures and extended time-at-temperature involved in DS casting of columnar grain and single crystal hollow superalloy airfoils (e.g. 1480 to 1600 degrees C. for ½ to 3 hours). As a result, positive core wall location and control features typically are provided in the form of platinum pins and/or alumina pins located between the core and ceramic shell mold wall in which the core is disposed at selected locations to maintain core position relative to the shell mold and counter the tendency of the core to creep at high DS (columnar grain and single crystal) casting temperature for extended time.

U.S. Pat. No. 5,580,837 describes an alumina-based ceramic core formed, prior to sintering, from an admixture of alumina particles, yttria aluminate particles and a binder followed by debinding and sintering for use in investment casting of hollow airfoils from reactive superalloys, such as yttrium-bearing nickel base superalloys.

An object of the present invention is to improve the creep resistance of such alumina-based cores as described in the above patents at elevated casting temperature used for casting metallic materials, such as especially reactive nickel based superalloys.

SUMMARY OF THE INVENTION

An embodiment of the present invention provides an impregnated fired porous alumina-based ceramic core for use in a mold in the casting of molten metals and alloys wherein the core is impregnated with yttria to improve core creep resistance at elevated casting temperature.

Another embodiment of the invention involves impregnating the fired porous alumina-based ceramic core with colloidal yttria or other impregnating medium that will provide yttria in pores of the core to improve core creep resistance.

Still a further embodiment of the invention provides an impregnated fired, porous alumina-based core that includes yttria impregnant in pores of the core and that exhibits a substantial increase in creep resistance at elevated casting temperature and time as compared to an unimpregnated fired, porous alumina-based core. The yttria impregnant in the core pores preferably is present in an amount of about 1% to about 5% by weight of the core (based on weight gain of the dried impregnated core).

The above objects and advantages of the present invention will become more readily apparent from the following detailed description taken with the following drawings.

DESCRIPTION OF THE DRAWINGS

The FIGURE is a perspective view of a fired, porous ceramic core for a gas turbine airfoil that can be made pursuant to the invention.

DETAILED DESCRIPTION OF THE INVENTION

The invention provides an impregnated alumina-based ceramic core especially useful in casting of hollow gas turbine engine blades and vanes (airfoils) using conventional equiaxed and directional solidification (DS) techniques from reactive metallic materials, especially reactive nickel base superalloys. For example, the invention can be practiced to cast reactive nickel base superalloys that include yttrium to make hollow airfoil castings. Such reactive Y-bearing nickel base superalloys are well known, for example, as General Electric Rene N5 nickel base superalloy and PWA 1487 nickel base superalloy. The invention is not limited to airfoil shaped cores as any other fired, porous ceramic core can be made by practice of the invention.

For purposes of illustration and not limitation, the FIGURE shows a fired, porous ceramic core 10 for use in investment casting a hollow gas turbine blade where the core has a configuration of internal cooling passages to be formed in the blade casting. The core 10 includes a root region 12 and an airfoil region 14. The airfoil region 14 includes a leading edge 16 and trailing edge 18. Openings or slots 20 of various configurations and dimensions can be provided through the core 10 to form elongated walls, rounded pedestals and other features in the interior of the cast blade as well known.

In one embodiment of the invention, the ceramic core 10 is formed by preparing a mixture of ceramic filler material and a binder material as described in U.S. Pat. No. 4,837,187, the teachings of which are incorporated herein by reference. For example, as set forth in U.S. Pat. No. 4,837,187, the mixture can comprise, prior to sintering, about 80% to 86% by weight of ceramic filler material and about 14% to about 20% by weight of a binder material. The ceramic filler material comprises about 66% to 95% by weight coarse and fine $Al_2O_3$ particles, about 1% to about 20% by weight $Y_2O_3$ particles, about 1% to about 5% grain growth inhibiting agent (e.g. only MgO), and the balance a carbon-bearing fugitive filler material, all as described in detail in the above '187 patent.

The binder preferably is a thermoplastic wax-based binder system having a low melting point described in detail in the above '187 patent. By way of example only, the binder system may be comprised of 91% to 96% by weight of a wax system, about 1% to about 6% by weight of an anti-segregation agent, and about 1% to about 5% by weight of dispersing agent.

The ceramic core can be formed by conventional injection molding, transfer molding, or pouring employed to make green ceramic cores. For example only, in injection molding a ceramic core shape, a fluid ceramic powder/binder mixture is heated to 80 to 125 degrees C. and injected into a steel core die having a molding cavity having the core configuration desired. Injection pressures in the range of 200 psi to 2000 psi are used to pressurize the fluid ceramic/binder mixture in the molding cavity defined by the dies. The dies may be cooled, held at room temperature, or slightly heated depending upon the complexity of the desired core configuration. After the ceramic/binder mixture solidifies in the die, the die is opened, and the green, unfired ceramic core is removed for thermal processing to remove the fugitive binder and sinter the green ceramic core to form a fired, porous ceramic core 10 to be used in the well known lost wax investment casting process. Sintering achieves consolidation of the ceramic powder particles by heating to impart strength to the core for use in the investment casting process. Sintering of the green ceramic core is achieved by means of heat treatment to an elevated temperature based on the requirements of the ceramic powders employed. Above U.S. Pat. No. 4,837,187 incorporated herein by reference describes prebaking and sintering the alumina-based ceramic core wherein sintering is conducted for about 48 hours using a heating rate of about 60 degrees C. to about 120 degrees C. per hour up to a sintering temperature in the range of about 1600 to 1700 degrees C. During sintering, the carbon-bearing fugitive filler material is burned out of the core and leaves an interconnected network of porosity in the sintered core.

Subsequent to sintering, the ceramic core has a microstructure characterized by the presence of substantially unreacted $Al_2O_3$ particles having a polycrystalline composition consisting essentially of $3Y_2O_3:5Al_2O_3$ on surfaces of the $Al_2O_3$ particles.

In another embodiment of the invention, the ceramic core 10 is formed by preparing a mixture of yttrium aluminate particles, alumina particles, and a binder material followed by injection molding and sintering to form a fired, porous alumina-based core as described in U.S. Pat. No. 5,580,837, the teachings of which are incorporated herein by reference.

The invention involves impregnating a fired, porous alumina-based ceramic core made pursuant to U.S. Pat. No. 4,837,187; 5,580,837 and any other technique where the core is made from a mixture which consists essentially of alumina particles in a binder material, or of alumina particles and yttrium bearing particles, such as for example only yttrium aluminate, in a binder material. The particular core forming technique, such as injection molding, transfer molding and pouring, and the particular thermal processing technique form no part of the invention as conventional core molding techniques and thermal processing techniques can be used to make the fired, porous alumina-based ceramic core which is treated pursuant to the invention.

The present invention strengthens such fired, porous alumina-based cores 10 by impregnating the cores to provide yttria impregnant in pores of the fired, porous core. The fired, porous alumina-based ceramic core can be impregnated with commercially available colloidal yttria or other impregnating medium that impregnates the core pores with yttria and dried to substantially improve core creep resistance at elevated casting temperature and casting time, especially those used in DS casting of reactive nickel superalloys to make columnar grain and single crystal castings.

For purposes of illustration and not limitation, a preferred colloidal yttria is available as Nyacol colloidal yttria from Nano Technologies Inc., Ashland, MA. This commercially available colloidal yttria includes 14% by weight yttria solids and balance water and acetic acid.

The invention can be practiced using an aqueous or organic solution as an impregnating medium wherein the solution includes yttrium salts or yttrium metal-organics that are deposited in pores of the core to comprise a yttria precursor that will form yttria in the pores during the mold preheating stage of the casting operation. Such a solution can comprise yttrium acetate, yttrium nitrate, yttrium carbonate, yttrium alkoxide or other yttria precursors.

The fired, porous alumina-based core is dried after impregnation to remove liquid phase of the impregnant. To this end, the impregnated core can be dried in ambient air at room temperature or in an oven using superambient forced air at, for example, 180 to 200 degrees F for a time sufficient to fully dry the core.

The impregnated fired, porous alumina-based core pursuant to the invention includes yttria solids as a film in pores of the core. The impregnated fired, porous core exhibits a substantial increase in creep resistance at elevated casting temperature and time as compared to an unimpregnated fired, porous alumina-based core. The yttria solids in the core pores preferably are present in an amount of about 1% to about 5% by weight of the core, the yttria solids in the core pores being based on weight gain of the dried impregnated core.

The following Examples are offered to illustrate but not limit the invention. Fired, porous alumina-based cores for a first stage gas turbine engine blade and fired, porous alumina-based core testbars were made pursuant to the teachings of U.S. Pat. No. 4,837, 187. The core testbars had dimensions of 5 inches length, ½ inch width and ¼ inch thickness.

Six fired, porous cores and twelve fired, porous alumina-based core testbars were impregnated with yttria using the 14% by weight yttria sol (colloid) commercially available as Nyacol colloidal yttria and described above. The cores and testbars were impregnated by immersion in the colloidal yttria at ambient pressure for 2 minutes followed by air blow-off using 30 psi shop compressed air to remove excess colloidal yttria from the surface and oven drying at 180 degrees F. for 1 hour. These core testbars are designated "A" in Table I below.

Six fired, porous cores and twelve fired, porous alumina-based core testbars were impregnated with alumina using a 15% by weight alumina sol (colloid) made by diluting commercially available Bluonic A colloidal alumina from Wesbond Corporation, Wilimington, Del. For example, 3 parts of commercially available Bluonic A colloidal alumina was diluted using one part of deionized water to achieve the 15% by weight colloidal alumina. The cores and testbars were impregnated by immersion in the 15% by weight colloidal alumina at ambient pressure for 2 minutes followed by a air blow-off using 30 psi shop compressed air to remove excess colloidal alumina from the surface and oven drying at 180 degrees F. for 1 hour. These core testbars are designated "B" in Table I.

Six fired, porous cores and core testbars were impregnated first with yttria using a 7% by weight yttria sol (colloid) made by diluting the above commercially available 14% by weight colloidal yttria (Nyacol colloidal yttria) with deionized water. The cores and core testbars were impregnated by immersion in the 7% by weight colloidal yttria at ambient pressure for 2 minutes followed by a air blow-off using 30 psi shop compressed air to remove excess colloidal yttria from the surface and oven drying at 180 degrees F. for 1 hour. The cores and core testbars then were impregnated with alumina by immersion in a 7.5% by weight colloidal alumina at ambient pressure for 2 minutes followed by a air blow-off using 30 psi shop compressed air to remove excess colloidal alumina from the surface and oven drying at 180 degrees F. for 1 hour. The 7.5% colloidal alumina was made by diluting three parts of the off-the-shelf Bluonic A colloidal alumina with 5 parts of deionized water. These core testbars are designated "C" in Table I.

The impregnated fired, porous core testbars were tested for modulus of rupture (MOR) at 1520 degrees C. using a four point bending load pursuant to ASTM standard 674-77. They were also tested for creep resistance at 1566 degrees C. using flexure creep test and thermal expansion using a Anter model 1161 dilatometer available from Anter Corp., Pittsburgh, Pa. Unimpregnated fired, porous core testbars (designated "None") were included for comparison.

Table I sets forth the MOR results (MOR values set forth in psi-pounds per square inch).

TABLE I

| Testbar | Number of Testbars | Average MOR (psi) | Standard Deviation |
|---------|--------------------|--------------------|--------------------|
| None | 12 | 1800 | 224 |
| A | 12 | 2245 | 254 |
| B | 12 | 1984 | 180 |
| C | 12 | 1972 | 203 |

It is apparent that impregnation of the fired, porous core test-bars with yttria using the 14% by weight colloidal yttria (see testbars designated "A") substantially improved the MOR as compared to the MOR of the unimpregnated "NONE" core testbars. The fired, porous core testbars impregnated with alumina (see testbars designated "B") as described above and with yttria followed by alumina (see testbars designated "C") as described above substantially improved the MOR as compared to the MOR of the unimpregnated "NONE" core testbars. However, the core testbars impregnated with 14% by weight colloidal yttria showed the largest increase in strength.

Table II sets forth the creep results for the impregnated core testbars. Creep values are in inches and creep rate is in inches/hour.

TABLE II

| Testbar | Creep at 2850 F. | Creep after 1 Hour Hold | Creep Rate at 2850 F. |
|---------|------------------|-------------------------|-----------------------|
| None | 0.115 | 0.430 | 0.315 |
| A | 0.161 | 0.231 | 0.071 |
| B | 0.237 | 0.354 | 0.117 |
| C | 0.186 | 0.281 | 0.094 |

The first column in Table II shows the average cumulative deflection of the testbars after being ramped to 1566 degrees C. at 300 degrees C./hour. The testbars were weighted so that the bottom span was loaded to 150 psi tensile stress at the initiation of the test. The second column is the cumulative deflection after the temperature ramp and a one hour hold at 1566 degrees C., which simulates a typical DS casting temperature for columnar grain and single crystal castings to which the core is exposed for extended time. The third column is the rate of deflection during the one hour hold period.

It is apparent that impregnation of the fired, porous core test-bars with yttria using the 14% by weight colloidal yttria (see testbars designated "A") substantially improved the creep rate as compared to the creep rate of the unimpregnated "NONE" core testbars. For example, the creep rate was reduced about 78% for the testbars designed "A" as compared to the "None" (unimpregnated) testbars.

The fired, porous core testbars impregnated with alumina (see testbars designated "B") as described above and with yttria followed by alumina (see testbars designated "C") as described above exhibited substantially reduced creep rates as compared to the unimpregnated "NONE" core testbars, although the reductions in creep rate were not as high as the reductions achieved by the core testbars designated "A". The alumina impregnated cores exhibited high cumulative creep (column 2 of Table 2) outside the scope of the invention.

The thermal expansion characteristics below 1500 degrees C. of core testbars designated "A". "B", and "C" and the unimpregnated "None" core testbars were comparable to one another. Thus, impregnation of the fired, porous alumina-based core with colloidal yttria and or alumina as described above did not affect thermal expansion characteristics.

Casting trials using 1st stage turbine blade cores pursuant to the invention were conducted with standard single crystal techniques to make forty two cored single crystal nickel base superalloy blades. The casting trials resulted in a 50% reduction in the number of scrap castings caused by core movement during casting.

The invention is advantageous to increase creep resistance of fired, porous alumna-based cores at elevated casting temperatures and times. Increased core creep resistance may reduce use of platinum or alumina pins in preparation of the core for casting. Moreover, increased core creep resistance translates into better control of the casting wall thickness such that thinner casting walls may be specified for gas turbine airfoils.

Although the invention has been described with respect to certain embodiments thereof, those skilled in the art will appreciate that the invention is not limited to these embodiments and changes, modifications, and the like can be made therein within the scope of the invention as set forth in the appended claims.

We claim:

1. A method of treating a fired porous alumina-based ceramic core for use in the casting of molten metallic materials, comprising impregnating said core with yttria to improve core creep resistance at elevated casting temperature.

2. The method of claim 1 wherein said core is impregnated by immersing it in colloidal yttria.

3. The method of claim 1 wherein the core is impregnated by immersing it in a medium including a yttria precursor that forms yttria when heated and then heating the core.

4. The method of claim 1 wherein said core is made from a mixture of alumina particles, yttria particles and a binder.

5. The method of claim 1 wherein said core is made from a mixture of alumina particles, yttrium bearing particles and a binder.

6. The method of claim 2 including drying said core after impregnation.

7. An impregnated fired, porous alumina-based core that includes yttria impregnant in pores of the core and that exhibits a substantial increase in creep resistance at an elevated casting temperature as compared to an unimpregnated fired, porous alumina-based core.

8. The core of claim 7 wherein the yttria impregnant in the core pores is present in an amount of about 1% to about 5% by weight of the core.

9. The core of claim 7 which includes a microstructure comprising alumina particles and a yttria-bearing constituent.

10. The core of claim 9 wherein the yttria-bearing constituent comprises $3Y_2O_3:5Al_2O_3$.

* * * * *